United States Patent
Sulai et al.

(10) Patent No.: US 10,359,845 B1
(45) Date of Patent: Jul. 23, 2019

(54) DISPLAY ASSEMBLY USING DYNAMIC LIQUID CRYSTAL ARRAY

(71) Applicant: Facebook Technologies, LLC, Menlo Park, CA (US)

(72) Inventors: Yusufu Njoni Bamaxam Sulai, Bothell, WA (US); Jacques Gollier, Redmond, WA (US); Ying Geng, Sammamish, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/968,589

(22) Filed: May 1, 2018

(51) Int. Cl.
*G06F 3/01* (2006.01)
*G02F 1/29* (2006.01)

(52) U.S. Cl.
CPC .............. *G06F 3/013* (2013.01); *G02F 1/29* (2013.01); *G02F 2203/24* (2013.01); *G02F 2203/50* (2013.01)

(58) Field of Classification Search
None
See application file for complete search history.

(56) References Cited

U.S. PATENT DOCUMENTS

| | | | | |
|---|---|---|---|---|
| 5,808,589 A | * | 9/1998 | Fergason | ........... G02B 27/0172 345/8 |
| 2001/0043163 A1 | * | 11/2001 | Waldern | ............... G02B 5/1885 345/7 |
| 2008/0266387 A1 | * | 10/2008 | Krijn | .................... H04N 13/305 348/51 |
| 2015/0138184 A1 | * | 5/2015 | Bilbrey | .................. G06F 3/013 345/419 |
| 2015/0153578 A1 | * | 6/2015 | Oka | .................. G02B 27/2214 349/15 |
| 2017/0109562 A1 | * | 4/2017 | Shroff | ..................... G06F 1/163 |
| 2017/0255020 A1 | * | 9/2017 | Tam | .................. G02B 27/0172 |
| 2018/0120573 A1 | * | 5/2018 | Ninan | ................ G02B 27/0179 |

(Continued)

OTHER PUBLICATIONS

NVidia Near-eye Light Field Displays, buffed.de, Published Aug. 1, 2013, May be Viewed at<URL:https://www.youtube.com/watch?v=f_CkJCZ3Uxw&feature=youtu.be>.

(Continued)

*Primary Examiner* — Lunyi Lao
*Assistant Examiner* — Benjamin X Casarez
(74) *Attorney, Agent, or Firm* — Fenwick & West LLP

(57) ABSTRACT

A head-mounted display includes an electronic display, a liquid crystal (LC) array with LC cells forming a dynamic lens array, an optical assembly, an eye tracker, and a controller. The LC array refracts image light emitted from the electronic display. The LC array includes a gaze region with a subset of the LC cells forming a portion of the dynamic lens array having a lens density different than that associated with remaining portions of the LC cells outside the gaze region. The eye tracker tracks a gaze location corresponding to a foveal region of a user's eye. The controller generates emission instructions and provides the emission instructions to the LC array to change location of the gaze region in the LC array based on the tracked gaze location. The optical assembly directs portions of image light refracted by the gaze region toward the foveal region of the user's eye.

19 Claims, 6 Drawing Sheets

(56) References Cited

U.S. PATENT DOCUMENTS

2018/0275394 A1* 9/2018 Yeoh .................. G02B 3/14
2018/0284451 A1* 10/2018 Eash ................ G02B 27/0172

OTHER PUBLICATIONS

Lanman, D., Light Field Displays, AWE2014, NVidia, Published Jun. 2, 2014, May be Viewed at<URL:https://www.youtube.com/watch?v=8hLzESOf8SE>.

* cited by examiner

DISPLAY ASSEMBLY USING DYNAMIC LIQUID CRYSTAL ARRAY

BACKGROUND

The present disclosure generally relates to displaying content to a user of an artificial reality system, and more specifically relates to foveated rendering in the artificial reality system using a display assembly based on a dynamic liquid crystal array.

Various artificial reality systems often perform foveated rendering before presenting content to a user. Based on information related to a position and orientation of a user's eye in an eye box (i.e., eye gaze), a higher resolution can be applied in a specific region of an electronic display that corresponds to the user's eye gaze (i.e., a foveal region of the user's eye), and a lower resolution can be used in other regions of the electronic display. The resolution of image light emitted from the electronic display can be reduced in non-foveal regions of the electronic display either gradually or in a step-wise fashion, e.g., by over an order of magnitude per each step. In this manner, by implementing foveated rendering, substantial savings in power consumption and computing cycles can be achieved when presenting content on the rendered electronic display, while thriving not to compromise user's visual experience. However, foveated rendering of content presented on the electronic display of the artificial reality system can often lead to unsatisfactory visual experience. This can be, for example, due to the fact that the foveated rendering applied in artificial reality systems is not fast enough to accurately track changes in the user's eye gaze.

SUMMARY

Embodiments of the present disclosure support a head-mounted display (HMD) comprising a display assembly, an optical assembly, and an eye tracker. The display assembly includes an electronic display and a liquid crystal (LC) array. The electronic display is configured to emit image light. The LC array includes a plurality of LC cells positioned in front of the electronic display and configured to refract the image light received from the electronic display. A dynamic lens array providing a variable lens density across the electronic display is formed by the LC cells of the LC array. A gaze region of the LC array comprises a subset of the LC cells forming a portion of the dynamic lens array having a lens density different than one or more other lens densities of one or more other portions of the dynamic lens array associated with remaining portions of the LC cells outside the gaze region. The eye tracker is configured to track a gaze location corresponding to a foveal region of an eye of a user wearing the HMD. A controller may be coupled to the eye tracker and the LC array. The controller may generate emission instructions based on information about the tracked gaze location, and provide the emission instructions to the LC array to change location of the gaze region in the LC array in accordance with the tracked gaze location. The optical assembly directs the image light refracted by the LC array to an eye box of the HMD corresponding to a location of the user's eye.

Figure 1A:
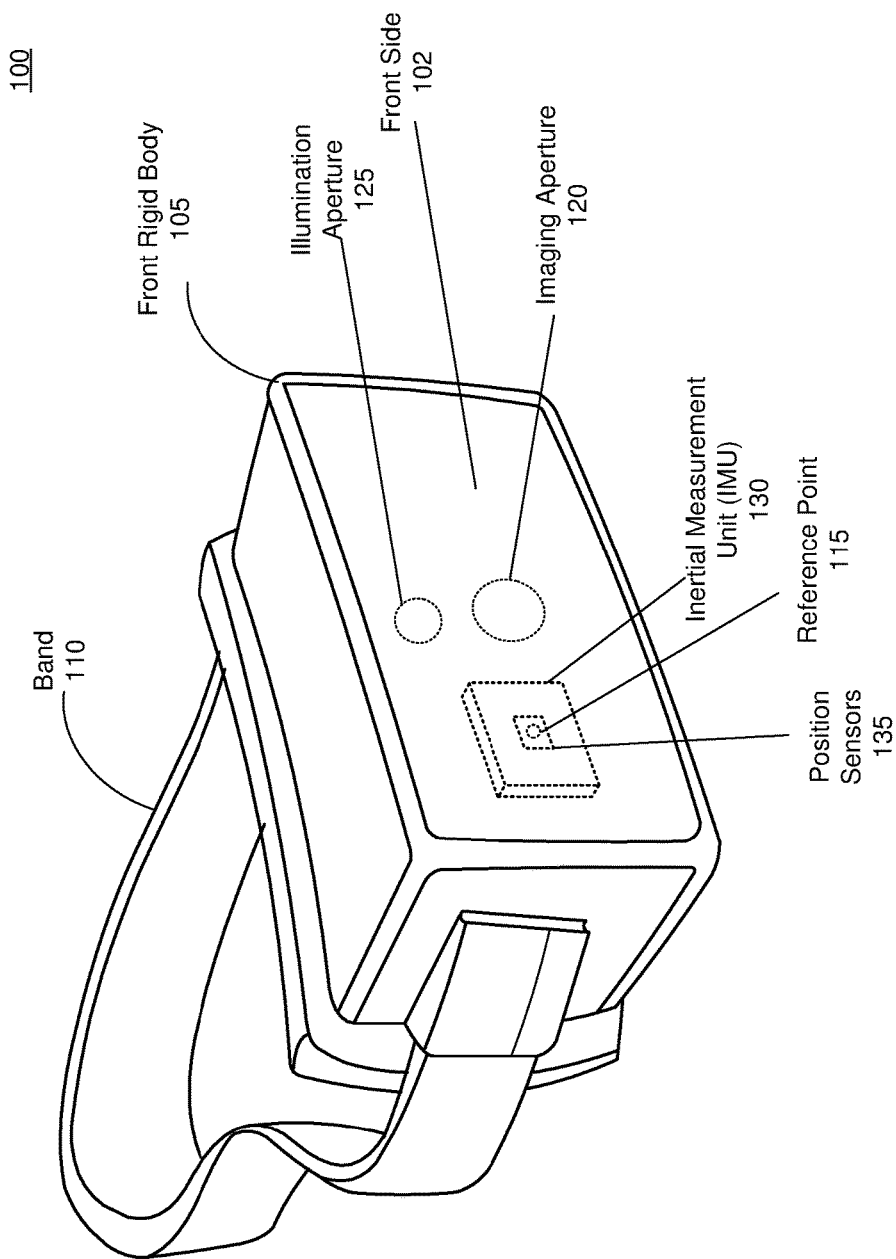
FIG. 1A is a diagram of a head-mounted display (HMD), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A HMD displays content to a user. The HMD may be part of an artificial reality system. The HMD includes a display assembly, an optical assembly, and an eye tracker. Conventional displays that operate as light field displays typically include a fixed resolution microlens array positioned in front of an electronic display, wherein the electronic display renders a specific image for each lens in the microlens array. On the other hand, the display assembly presented in this disclosure includes an electronic display and a variable liquid crystal (LC) array with a plurality of LC cells that replace an array of microlenses. An LC cell of the LC array represents a discrete unit that includes a fluid and an associated electrode structure that orients the fluid in the cell when a voltage is applied. The variable LC array features a variable lens array density over different regions of the LC array, which facilitates dynamic foveated rendering.

A dynamic lens array having the variable lens array density may be formed by grouping one or more LC cells to functionally operate as a lens of the dynamic lens array. A pitch of the LC array determines a lower limit of a pitch of the dynamic lens array, i.e., the smallest lens in the dynamic lens array may be composed of a single LC cell. The variable density of dynamic lens array can be achieved by varying area sizes (e.g., diameters) of lenses in the dynamic lens array. For example, diameters of lenses formed by LC cells in the gaze region of the LC array are smaller than diameters of lenses formed by LC cells outside the gaze region. In this way, the lens array density is effectively the highest in the gaze region, which translates into the highest image resolution when a user is looking through the gaze region of the LC array. In some embodiments, variable area sizes of lenses in the dynamic lens array can be achieved by controlling phase functions of the LC cells. A lens in the dynamic lens array having an area size (e.g., diameter) of a defined size can be formed based on a specific number of adjacent LC cells that contribute with the same phase function to an overall phase function of the LC array. For example, if a smaller number of adjacent LC cells have the same phase function, a diameter of the lens in the dynamic lens array is smaller, and vice versa.

The eye tracker provides information about a gaze location that corresponds to a foveal region of a user's eye. The LC array includes a gaze region with a specific lens array density that tracks with the gaze location of the user's eye. In some embodiments, the gaze region has a lens array density that is higher than one or more lens array densities in other regions of the LC array outside the gaze region. Accordingly, content viewed through the gaze region of the LC array is in focus—and tracks with a user's eye gaze. Content viewed outside the gaze region of the LC array is blurred, thereby providing a system for foveated rendering. The content viewed through the gaze region of the LC array have higher resolution because a lens array density (which determines resolution) is markedly higher in the gaze region than in other portions of the LC array. On the other hand, in some embodiments, the ability to reconstruct the wavefront in the gaze region may be compromised because a number of pixels of the electronic display underneath each lens in the gaze region can be small and bellow a threshold number. Note that a number of pixels under each lens is proportional to the ability to reconstruct the wavefront. A number of lenslets per degree determines image resolution, and having smaller lenslets improves the image resolution, but may reduce resolution of the wavefront sampling. In some embodiments, while providing high resolution in the gaze region (e.g., using smaller lenslets in the gaze region), the content can be rendered as if the wavefront is presented at infinity where the wavefront is flat and does not require high resolution wavefront sampling. Outside the gaze region, the lens array density falls, which reduces image resolution but it also recovers the ability to reconstruct the wavefront. In this case, the content may need to be rendered with a more appropriate wavefront, which could drive accommodation.

FIG. 1A is a diagram of a HMD 100, in accordance with one or more embodiments. The HMD 100 may be part of an artificial reality system. In embodiments that describe an AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 may also include a depth camera assembly (DCA) configured to determine depth information of a local area surrounding some or all of the HMD 100. The HMD 100 may also include an imaging aperture 120 and an illumination aperture 125, and an illumination source of the DCA emits light (e.g., a structured light pattern) through the illumination aperture 125. An imaging device of the DCA captures light from the illumination source that is reflected from the local area through the imaging aperture 120.

The front rigid body 105 includes one or more electronic display elements (not shown in FIG. 1A), one or more integrated eye tracking systems (not shown in FIG. 1A), an Inertial Measurement Unit (IMU) 130, one or more position sensors 135, and the reference point 115. In the embodiment shown by FIG. 1A, the position sensors 135 are located within the IMU 130, and neither the IMU 130 nor the position sensors 135 are visible to a user of the HMD 100. The IMU 130 is an electronic device that generates IMU data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 1B:
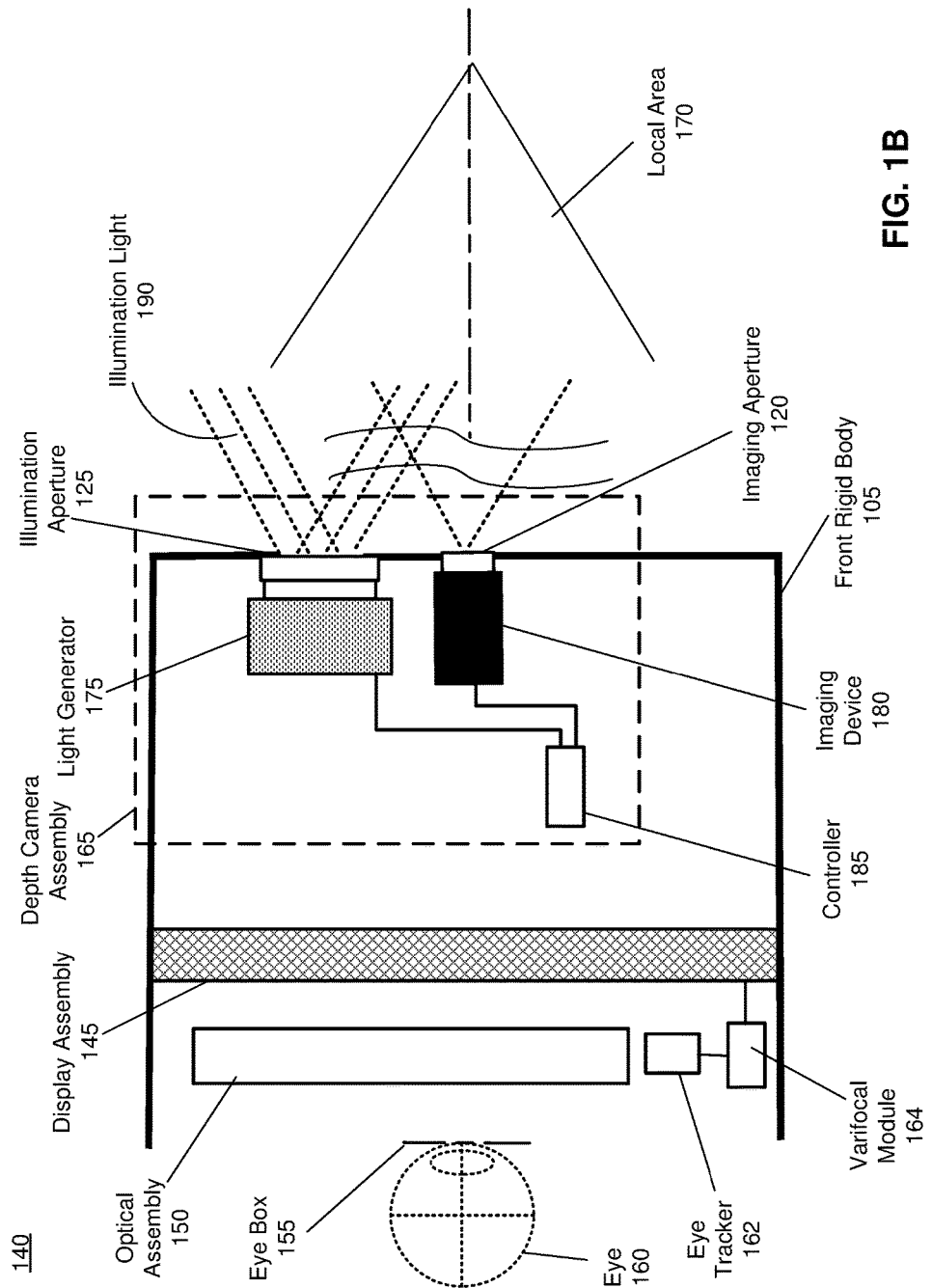
FIG. 1B is a cross section of a front rigid body of the HMD in FIG. 1A, in accordance with one or more embodiments.

FIG. 1B is a cross section 140 of the front rigid body 105 of the HMD 100 shown in FIG. 1A, in accordance with one or more embodiments. As shown in FIG. 1B, the front rigid body 105 includes a display assembly 145 and an optical assembly 150 that together provide image light to an eye box 155. The eye box 155 is a region in space that is occupied by a user's eye 160. The front rigid body 105 further includes an eye tracker 162 for tracking position of the eye 160 in the eye box 155 (i.e., eye gaze), and a varifocal module 164 (i.e., a controller) coupled to the eye tracker 162 and the display assembly 145. For purposes of illustration, FIG. 1B shows a cross section 140 associated with a single eye 160, but another optical assembly 150, separate from the optical assembly 150, provides altered image light to another eye of the user. Also, another eye tracker 162, separate from the eye tracker 162 may be integrated into the front rigid body 105 to track position of the other eye of the user.

The display assembly 145 generates image light and dynamically adjusts focus of the image light, e.g., based in part on emission instructions from the varifocal module 164. The display assembly 145 includes an electronic display and a variable LC array (not shown in FIG. 1B) having a plurality of LC cells positioned in front of the electronic display. Conventional light field displays typically include a microlens array positioned in front of an electronic display that renders a specific image for each microlens in the microlens array. Similarly, the electronic display of the display assembly 145 renders a specific image for each LC cell of the variable LC array within the display assembly 145. As discussed, the variable LC array of the display assembly 145 may have a lens array density that dynamically varies over different portions of the LC array to dynamically adjust focus of different portions of image light generated by the electronic display and directed by the optical assembly 150 to the eye box 155. More details about operation of the variable LC array within the display assembly 145 are disclosed in conjunction with FIGS. 2A-2B, and FIG. 3.

The electronic display of the display assembly 145 may be configured to display images to the user in accordance with data received from a console (not shown in FIG. 1B) or from the varifocal module 164. The electronic display may emit, during a defined time period, a plurality of images, each image being optically corrected by a different portion of the variable LC array. In various embodiments, the electronic display may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. In addition to the LC array positioned in front of the electronic display, the display assembly 145 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more optical elements integrated into the display assembly 145 may have one or more coatings, such as anti-reflective coatings.

The optical assembly 150 magnifies image light received from the display assembly 145, corrects optical aberrations associated with the image light, and the corrected image light is presented to a user of the HMD 100. At least one optical element of the optical assembly 150 may be an aperture, a Fresnel lens, a refractive lens, a reflective surface, a diffractive element, a waveguide, a filter, or any other suitable optical element that affects the image light emitted from the display assembly 145. Moreover, the optical assembly 150 may include combinations of different optical elements. In some embodiments, one or more of the optical elements in the optical assembly 150 may have one or more coatings, such as anti-reflective coatings, dichroic coatings, etc. Magnification of the image light by the optical assembly 150 allows elements of the display assembly 145 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the field-of-view. In some embodiments, the optical assembly 150 is designed so its effective focal length is larger than the spacing to the display assembly 145, which magnifies the image light projected by the display assembly 145. Additionally, in some embodiments, the amount of magnification may be adjusted by adding or removing optical elements.

The eye tracker 162 determines eye tracking information for the user's eye 160. The eye tracking information may comprise information about a position and an orientation of the user's eye 160 in the eye-box 155, i.e., information about a gaze location that corresponds to a foveal region of the user's eye 160. The eye tracker 162 may include a light source (not shown in FIG. 1B) emitting light toward the eye box 155 and an imaging device or camera (not shown in FIG. 1B) that captures light reflected from one or more surfaces of the user's eye 160. In one embodiment, the user's eye 160 is illuminated with structured light. In this case, the eye tracker 162 may determine a position of the user's eye 160 and eye gaze based on distortions in a captured image of a pattern of the structured light reflected from at least one surface of the user's eye 160. In another embodiment, the eye tracker 162 determines eye position and eye gaze based on magnitudes of light reflected from at least one surface of the user's eye 160 that are captured over a defined period of time. More details about structure and operation of the eye tracker 162 are disclosed in conjunction with FIG. 2A and FIG. 3.

In some embodiments, the front rigid body 105 further includes a DCA 165 for determining depth information of one or more objects in a local area 170 surrounding some or all of the HMD 100. The DCA 165 includes a light generator 175, an imaging device 180, and a controller 185 that may be coupled to both the light generator 175 and the imaging device 180. The light generator 175 emits light through the illumination aperture 125. The light generator 175 illuminates the local area 170 with illumination light 190, e.g., in accordance with emission instructions generated by the controller 185. The controller 185 is configured to control, based on the emission instructions, operation of certain components of the light generator 175, e.g., to adjust an intensity and a pattern of the illumination light 190 illuminating the local area 170. In some embodiments, the illumination light may include a structured light pattern, e.g., dot pattern, line pattern, etc.

The light generator 175 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 175 can emit one or more light beams.

The imaging device 180 includes one or more cameras configured to capture, through the imaging aperture 120, at least a portion of the illumination light 190 reflected from the local area 170. The imaging device 180 captures one or more images of one or more objects in the local area 170 illuminated with the illumination light 190. The controller 185 coupled to the imaging device 180 is also configured to determine depth information for the one or more objects based on the captured portion of the reflected illumination light. In some embodiments, the controller 185 provides the determined depth information to a console (not shown in FIG. 1B) and/or an appropriate module of the HMD 100 (e.g., the varifocal module 164). The console and/or the HMD 100 may utilize the depth information to, e.g., generate content for presentation on the display assembly 145.

The varifocal module 164 may adjust focus of images displayed by the display assembly 145, based on, e.g., the eye tracking information obtained from the eye tracker 162. The varifocal module 164 may adjust focus of the displayed images by performing foveated rendering of image light by controlling operation of a variable LC array of the display assembly 145, based on the eye tracking information from the eye tracker 162. In some embodiments, the varifocal module 164 may adjust focus of the displayed images and mitigates vergence-accommodation conflict by adjusting a focal distance of the optical assembly 150 based on the eye tracking information. In some other embodiments, the varifocal module 164 utilizes the depth information from the controller 185 to generate content for presentation by the display assembly 145. More details about operation of the varifocal module 164 (controller) are disclosed in conjunction with FIGS. 2A-2B, and FIG. 3.

Figure 2A:
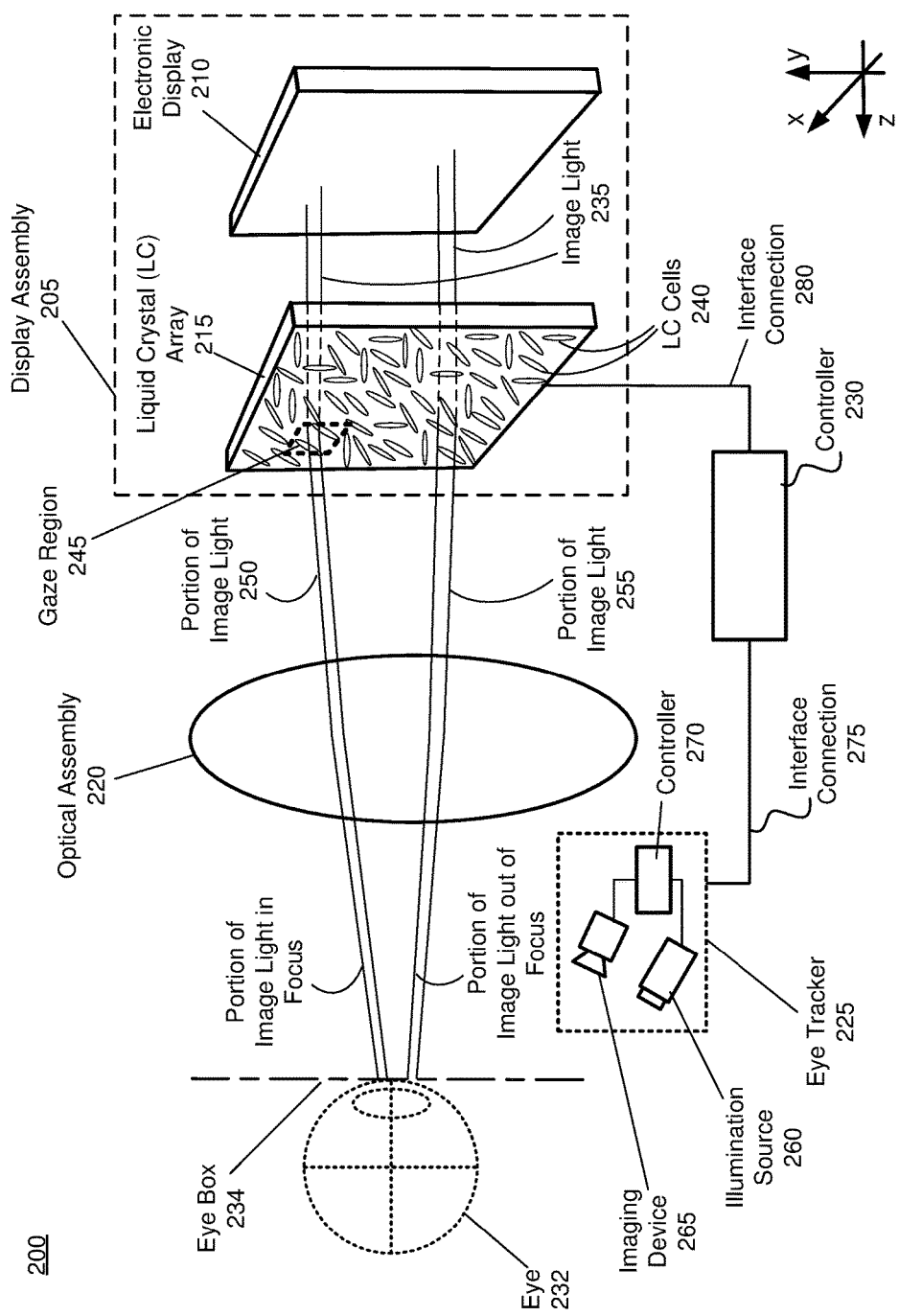
FIG. 2A illustrates an example display apparatus that includes an electronic display, a liquid crystal (LC) array, an eye tracker and a controller, which may be part of the HMD in FIG. 1A, in accordance with one or more embodiments.

FIG. 2A illustrates an example display apparatus 200, which may be part of the HMD in FIG. 1A, in accordance with one or more embodiments. The display apparatus 200 includes a display assembly 205 comprising an electronic display 210 and a variable LC array 215. The display assembly 205 may be an embodiment of the display assembly 145 in FIG. 1B. The display apparatus 200 further includes an optical assembly 220, an eye tracker 225, and a controller 230 coupled to the display assembly 205 and the eye tracker 225.

The electronic display 210 emits image light 235 toward the LC array 215. A resolution of the emitted image light 235 may be fixed and based on a pixel resolution of the electronic display 210. The electronic display 210 may be implemented as a LCD, an OLED display, an ILED display, an AMOLED display, a TOLED display, some other display, a projector, or some combination thereof. In some embodiments, the electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light 235 emitted from the electronic display 210.

The LC array 215 is positioned in front of the electronic display 210. The LC array 215 is configured to refract the image light 235 received from the electronic display 210. The LC array 215 includes a plurality of LC cells 240. Different regions of the LC array 215 comprising different subsets of the LC cells 240 may be configured to refract portions of the image light 235 by different refraction angles based on a lens array density in each region of the LC array 215. A dynamic lens array having a variable lens array density may be formed by grouping one or more LC cells 240 to functionally operate as a lens of the dynamic lens array (not shown in FIG. 2A). A pitch of the LC array 215 determines a lower limit of a pitch of the dynamic lens array, i.e., the smallest lens in the dynamic lens array may be composed of a single LC cells. The variable density of dynamic lens array formed by the LC cells 240 of the LC array 215 can be achieved by varying area sizes (e.g., diameters) of lenses in the dynamic lens array. In some embodiments, variable area sizes of lenses in the dynamic lens array can be achieved by controlling phase functions of the LC cells 240, e.g., by emission instructions from the controller 230. A lens in the dynamic lens array having an area size (e.g., diameter) of a defined size can be formed based on a specific number of adjacent LC cells 240 that contribute with the same phase function to an overall phase function of the LC array 215. For example, if a smaller number of adjacent LC cells 240 have the same phase function, a diameter of the lens in the dynamic lens array is smaller, and vice versa.

The LC array 215 includes a gaze region 245 comprising a subset of the LC cells 240 having a lens array density different than one or more other lens array densities associated with remaining portions of the LC cells 240 outside the gaze region 245. In some embodiments, the lens array density associated with the subset of the LC cells 240 in the gaze region 245 of the LC array 215 is higher than the one or more other lens array densities outside the gaze region 245. Diameters of lenses formed by LC cells 240 in the gaze region 245 may be smaller than diameters of lenses formed by LC cells 240 outside the gaze region 245. In this way, the lens array density is effectively the highest in the gaze region 245, which translates into the highest image resolution when a user is looking through the gaze region 245 of the LC array 215. The LC array 215 may provide optical correction to the image light 235 such that a portion of image light 250 refracted by the subset of the LC cells 240 in the gaze region 245 is in focus at the user's eye 232. Thus, the portion of image light 250 refracted by the subset of the LC cells 240 in the gaze region 245 reaches a foveal region of the user's eye 232 (not shown in FIG. 2A) after being directed by the optical assembly 220. Other portion of image light 255 refracted by the remaining portions of the LC cells 240 outside the gaze region 245 are not in focus at the user's eye 232, i.e., the other portion of image light 255 may reach at least one region of the user's eye 232 outside the foveal region after being directed by the optical assembly 220.

The optical assembly 220 is configured to direct different portions of the image light 235 refracted by different regions of the LC cells 240 in the LC array 215 to the eye box 234 corresponding to a location of the user's eye 232. The optical assembly 220 is configured to direct the portion of image light 250 refracted by the subset of the LC cells 240 in the gaze region 245 toward the foveal region of the user's eye 232. The optical assembly 220 is further configured to direct the other portion of image light 255 refracted by the remaining portions of the LC cells 240 outside the gaze region 245 toward at least one region of the user's eye 232 outside the foveal region. The optical assembly 220 may include one or more optical elements, such as an aperture, a Fresnel lens, a refractive lens, a reflective surface, a diffractive element, a waveguide, a filter, or any other suitable optical element that affects incident light (e.g., portion of image light 250 and the other portion of image light 255). Moreover, the optical assembly 220 may include combinations of different optical elements. The optical assembly 220 may be an embodiment of the optical assembly 150 in FIG. 1B.

The eye tracker 225 is configured to track a gaze location corresponding to a foveal region of the user's eye 232. The eye tracker 225 tracks the gaze location of the user's eye 232 by determining a position and orientation of the user's eye 232 in the eye box 234 over a period of time. As shown in FIG. 2A, the eye tracker 225 may include an illumination source 260, an imaging device (camera) 265, and a controller 270 coupled to the illumination source 260 and the imaging device 265. The controller 270 may be configured to determine a position and orientation of at least a single eye 232. In alternate embodiments, multiple illumination sources or multiple imaging devices may be employed for a single eye 232. Similarly, for each of the user's eye 232, a corresponding illumination source and imaging device may be employed. The components of the eye tracker 225 may be hidden from the user's sight as the illumination source 260, the imaging device 265 and the controller 270 are positioned outside a primary display optical path to the user's eye 232.

The illumination source 260 emits light toward the eye box 234 of the user's eye 232. In one embodiment, the illumination source 260 comprises a plurality of emitters that emit infrared (IR) light. The plurality of emitters of the illumination source 260 may be implemented on a single substrate. In an alternative embodiment, the illumination source 260 may comprise a single emitter of IR light. In yet another embodiment, the illumination source 260 is configured to emit structured light. The controller 270 coupled to the illumination source 260 may control operations of one or more light emitters in the illumination source 260. In one embodiment, the controller 270 modulates light emitted from the illumination source 260. In another embodiment, the controller 270 controls one or more wavelengths of light emitted from the illumination source 260. In one or more embodiments, the light emitted from the illumination source 260 comprises light having at least one of a wavelength of 850 nm or a wavelength of 940 nm, which is not visible to the user's eye 232. In general, the light emitted from the illumination source 260 comprises light having one or more wavelengths larger than 750 nm.

The imaging device 265 may be configured to capture an image of the eye 232 illuminated with light emitted from the illumination source 260. The imaging device 265 may be configured to capture light reflected from a surface of the eye 232. In one or more embodiments, the imaging device 265 comprises a camera configured to capture images in the IR. In some embodiments, the imaging device 265 is configured to capture a wide field-of-view of the user's eye 232. For example, the field-of-view of the full eye box 234 of the eye 232 and even significantly more can be covered by appropriate positioning of the illumination source 260 and the imaging device 265.

The controller 270 coupled to the illumination source 260 and the imaging device 265 is configured to determine eye tracking information for the user's eye 232, based on light reflected from at least one surface of the user's eye 232 and captured by the imaging device 265. In one or more embodiments, the eye tracking information determined by the controller 270 may comprise information about a position and orientation of the eye 232, i.e., information about an angle of eye gaze and eye gaze location. In one embodiment, the user's eye 232 is illuminated with structured light emitted from the illumination source 260. In this case, the controller 270 may use distortions in an image of the structured light reflected from at least one surface of the user's eye 232 and captured by the imaging device 265 to determine a position of the user's eye 232 and eye gaze. In another embodiment, the controller 270 determines eye position and eye gaze based on magnitudes of light reflected from at least one surface of the user's eye 232 that are captured by the imaging device 265 over a time period.

The eye tracker 225 may be coupled to the controller 230, e.g., via an interface connection 275 implemented between the controller 270 of the eye tracker 225 and the controller 230. The eye tracker 225 may provide, via the interface connection 275, information about the tracked gaze location of the user's eye 232 to the controller 230, e.g., at a rate that supports fast changes of user's gaze location. The eye tracker 225 may need to be fast enough such that fast eye motions are detected and reported, e.g., to the controller 230. In some embodiments, the eye tracker 225 provides information about the tracked gaze location of the user's eye 232 to the controller 230 with the rate of approximately 360 Hz. In some embodiments (not shown in FIG. 2A), the controller 270 is not part of the eye tracker 225, but instead the controller 230 is directly interfaced with the imaging device 265. Then, the controller 230 may be configured to determine the eye tracking information for the user's eye 232 and track gaze location of the user's eye 232 over time, based on light reflected from at least one surface of the user's eye 232 and captured by the imaging device 265.

The controller 230 may be coupled to the LC array 215, e.g., via an interface connection 280. The controller 230 may be an embodiment of the varifocal module 164 in FIG. 1B. As discussed, the controller 230 may be configured to receive (e.g., from the controller 270 of the eye tracker 225) information about the tracked gaze location of the user's eye 232 at a specific rate. Alternatively, the controller 230 may be configured to directly determine information about the tracked gaze location of the user's eye 232, based on one or more images of the user's eye 232 captured by the imaging device 265. The controller 230 may generate emission instructions based on the information about the tracked gaze location. Then, the controller 230 may provide (e.g., via the interface connection 280) the emission instructions to the LC array 215 to change location of the gaze region 245 in the LC array 215 in accordance with the tracked gaze location. In some embodiments, the controller 230 is configured to control phase functions of the LC cells 240 to change the lens array density formed by the LC cells 240 and change location of the gaze region 245, based on emission instructions.

In some embodiments, the controller 230 may be configured to determine mapping between each region of a plurality of regions of the LC array 215 (not shown in FIG. 2A) and a different gaze location of the user's eye 232. The information about the mapping may be stored in, e.g., a memory coupled to the controller 230 (not shown in FIG. 2A). The controller 230 may then provide the emission instructions to the LC array 215 to change the location of the gaze region 245 in the LC array 215 to one of the plurality of regions of the LC array 215, based on the tracked gaze location and the information about mapping.

Note that mapping between the plurality of regions of the LC array 215 and gaze locations of the user's eye 232 can be different for different users. The controller 230 may be configured to perform per user mapping between the plurality of regions of the LC array 215 and gaze locations of the user's eye 232. The per user mapping may be performed by first providing certain content for presentation (e.g., circular objects or objects of some other suitable shape) on predetermined regions of the electronic display 210, which correspond to predetermined regions of the LC array 215. The eye tracker 225 then tracks and determines different gaze locations of the user's eye 232 when the user is looking at the content presented on the predetermined regions of the electronic display 210 through the predetermined regions of the LC array 215. The controller 230 coupled with both the eye tracker 225 and the LC array 215 may then determine mapping between each region of the LC array 215 and a gaze location of the user's eye 232 for a specific user.

Figure 2B:
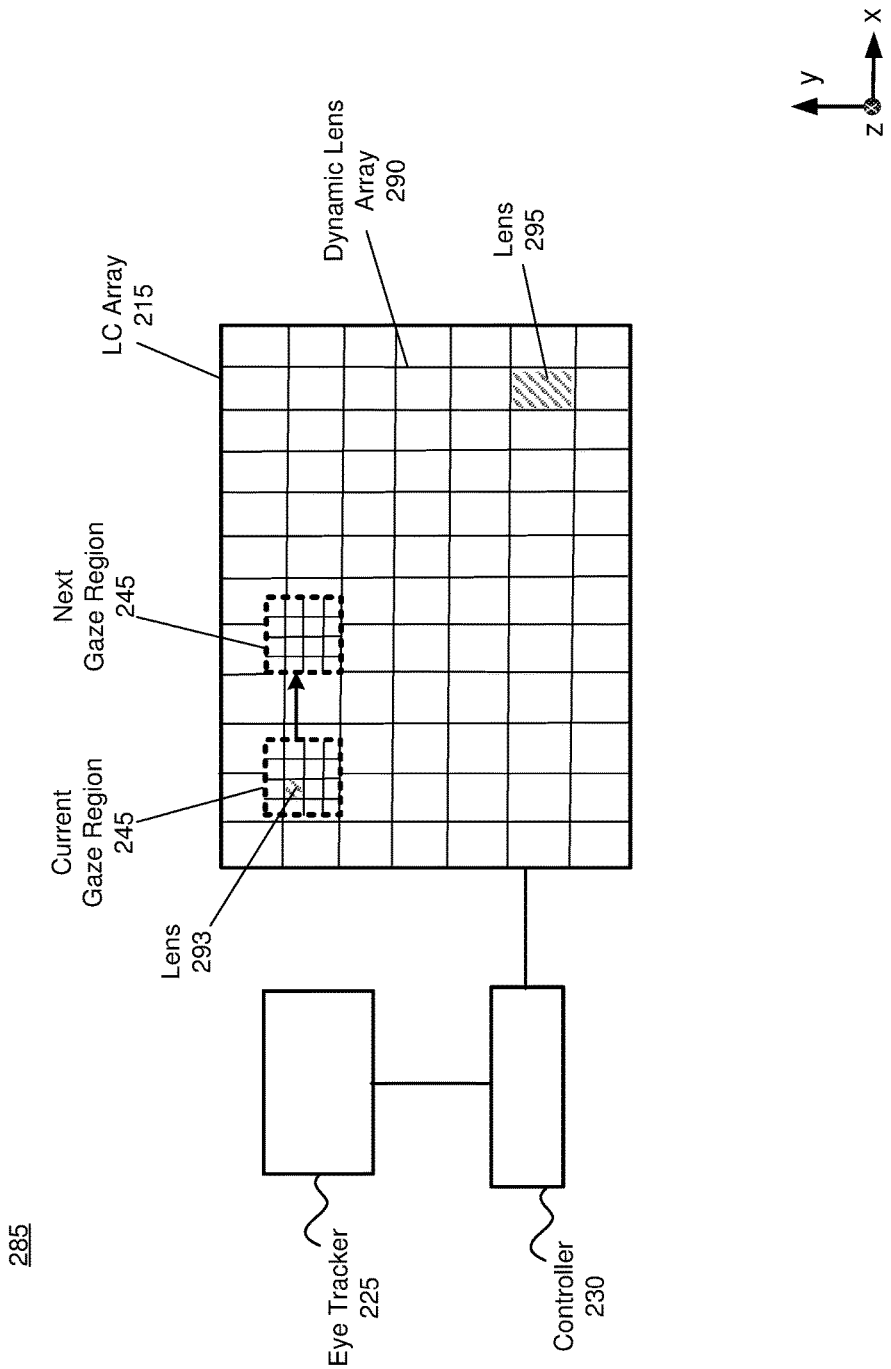
FIG. 2B illustrates a cross-sectional view of the LC array of the display apparatus from FIG. 2A, in accordance with one or more embodiments.

FIG. 2B illustrates a cross-sectional view 285 of the LC array 215 in FIG. 2A, in accordance with one or more embodiments. A dynamic lens array 290 comprising a grid of lenses can be formed by grouping one or more LC cells 240 to functionally operate as one lens of the dynamic lens array 290. In the illustrative embodiment of FIG. 2B, each lens in the dynamic lens array 290 is of rectangular shape, however other shapes are also supported (e.g., circular shape), and combinations thereof. A pitch of the LC array 215 determines a lower limit of a pitch of the dynamic lens array 290. As discussed, the variable density of dynamic lens array 290 can be achieved by varying area sizes of lenses in the dynamic lens array 290, e.g., by controlling phase functions of the LC cells 240 in the LC array 215 that form the dynamic lens area 290, based on emission instructions from the controller 230. The gaze region 245 is associated with the highest lens array density, i.e., a pitch of a portion of the dynamic lens array 290 occupying the gaze region 245 is smaller than a pitch of other portions of the dynamic lens array 290 outside the gaze region 245. As shown in FIG. 2B, a lens 293 formed by one or more LC cells 240 in the gaze region 245 is smaller than a lens 295 formed by LC cells 240 outside the gaze region 245.

Note that a location of the current gaze region 245 in the LC array 215 corresponds to a most recent gaze location of the user's eye 232 determined by the eye tracker 225. Location of the gaze region 245 in the LC array 215 moves over time across the LC array 215 (e.g., along x and/or y dimension) in concert with the tracked gaze location of the user's eye 232. Movement of the gaze region 245 can be accomplished by controlling phase functions of the LC cells 240 in the LC array 215 based on emission instructions from the controller 230, and effectively changing the lens array density across the LC array 215. The gaze region 245 may move across the LC array 215 (e.g., along x and/or y dimension) with a defined granularity, which may depend on resolution of mapping between the plurality of regions of the LC array 215 and gaze locations of the user's eye 232 (i.e., on a number of different regions of the LC array 215 being mapped to different gaze locations). Location of the gaze region 245 in the LC array 215 may change to a next gaze region 245 that corresponds to a latest tracked gaze location of the user's eye 232. In the illustrative embodiment of FIG. 2B, the current gaze region 245 is moved to the next gaze region 245 along x dimension of the LC array 215.

Figure 3:
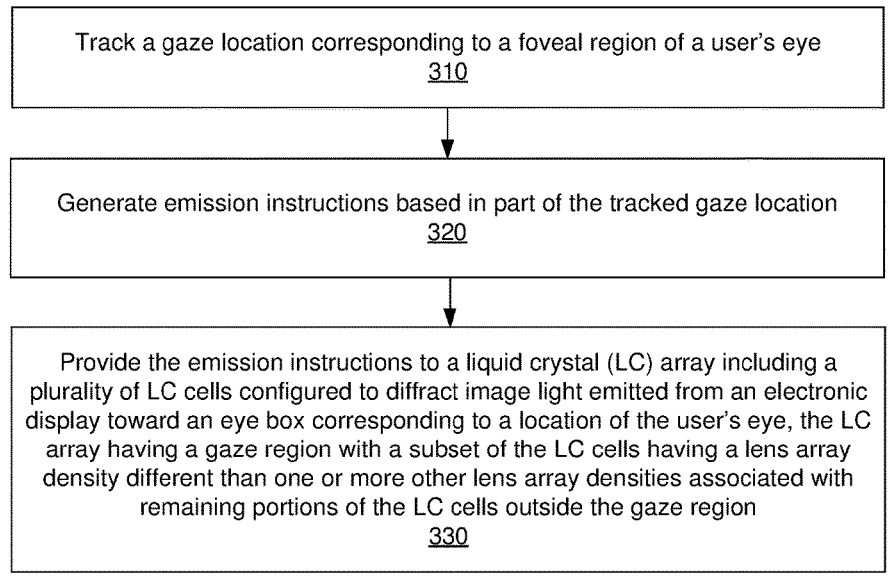
FIG. 3 is a flow chart illustrating a process of foveated rendering, in accordance with one or more embodiments.

FIG. 3 is a flow chart illustrating a process 300 for foveated rendering, which may be implemented at the HMD 100 in FIG. 1A, in accordance with one or more embodiments. The process 300 of FIG. 3 may be performed by the components of a HMD, e.g., by the components of the display apparatus 200 in FIG. 2A. Other entities may perform some or all of the steps of the process in other embodiments. Likewise, embodiments may include different and/or additional steps, or perform the steps in different orders.

The HMD tracks 310 (e.g., via an eye tracker) a gaze location corresponding to a foveal region of a user's eye. The eye tracker determines eye tracking information for the user's eye, which includes information about position and orientation of the user's eye in an eye box. The position and orientation of the user's eye in an eye box determines the gaze location corresponding to the foveal region of the user's eye.

The HMD generates 320 (e.g., via a controller) emission instructions based in part of the tracked gaze location. The emission instructions may comprise information about phase functions for different regions of LC cells in an LC array to vary one or more lens array densities across the LC array, based in part on the tracked gaze location.

The HMD provides 330 (e.g., via the controller) the emission instructions to the LC array including a plurality of LC cells configured to refract image light emitted from an electronic display toward an eye box of the HMD corresponding to a location of the user's eye. A dynamic lens array with the variable lens density across the LC array is formed by the LC cells. The LC array includes a gaze region that comprises a subset of the LC cells forming a portion of the dynamic lens array having a lens density based in part on the emission instructions different than one or more other lens densities of one or more other portions of the dynamic lens array associated with remaining portions of the LC cells outside the gaze region. The controller may provide the emission instructions to the LC array to change location of the gaze region in the LC array in accordance with the tracked gaze location. The lens density of the portion of the dynamic lens array associated with the gaze region of the LC array may be higher than the one or more other lens densities of the one or more other portions of the dynamic lens array outside the gaze region. A portion of the image light refracted by the subset of the LC cells in the gaze region of the LC array is in focus at the user's eye, i.e., the portion of image light reaches the foveal region of the user's eye. Other portions of the image light refracted by the remaining portions of the LC cells outside the gaze region of the LC array are not in focus at the user's eye, i.e., the portions of image light reach at least one region of the user's eye outside the foveal region.

System Environment

Figure 4:
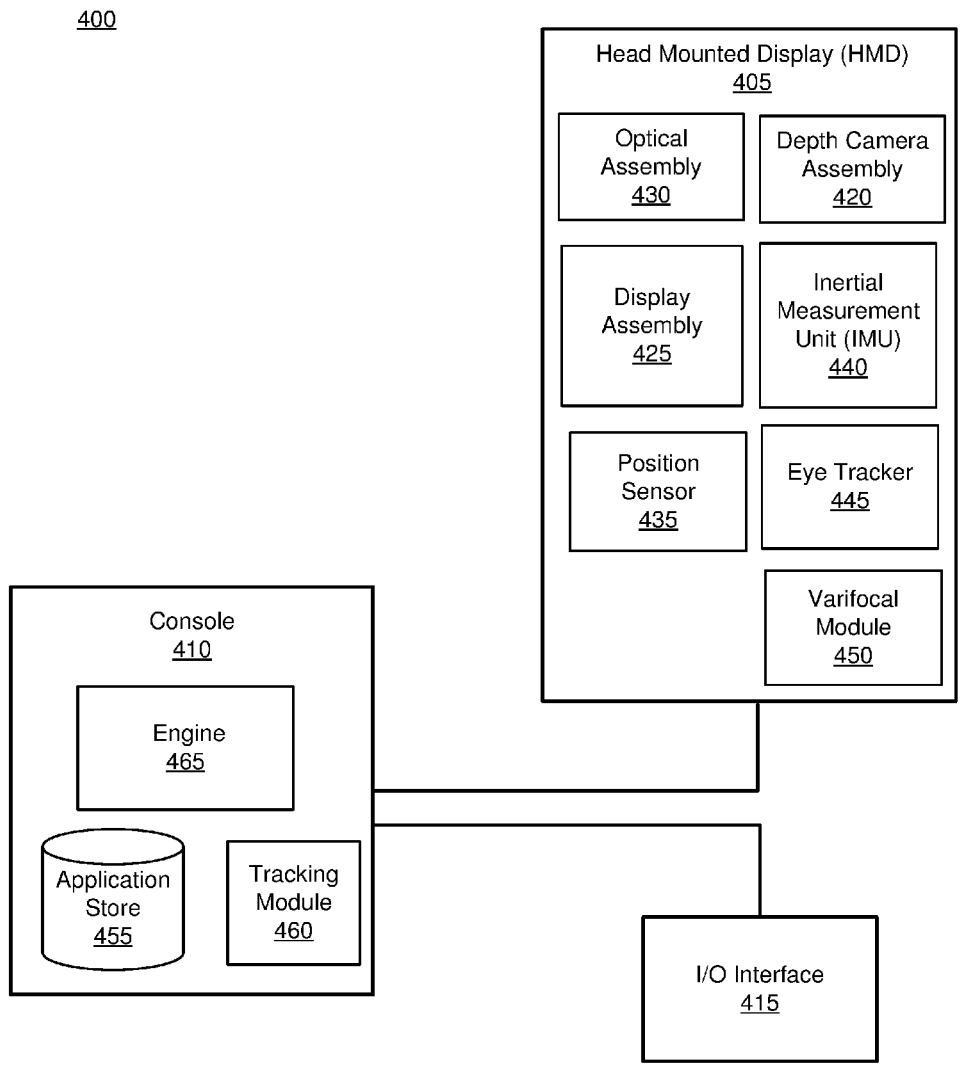
FIG. 4 is a block diagram of a HMD system in which a console operates, in accordance with one or more embodiments.

FIG. 4 is a block diagram of one embodiment of a HMD system 400 in which a console 410 operates. The HMD system 400 may operate in an artificial reality system. The HMD system 400 shown by FIG. 4 comprises a HMD 405 and an input/output (I/O) interface 415 that is coupled to the console 410. While FIG. 4 shows an example HMD system 400 including one HMD 405 and on I/O interface 415, in other embodiments any number of these components may be included in the HMD system 400. For example, there may be multiple HMDs 405 each having an associated I/O interface 415, with each HMD 405 and I/O interface 415 communicating with the console 410. In alternative configurations, different and/or additional components may be included in the HMD system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 405 may be the HMD 100 described above in conjunction with FIG. 1A.

The HMD 405 includes a DCA 420, a display assembly 425, an optical assembly 430, one or more position sensors 435, an IMU 440, an eye tracker 445, and a varifocal module 450. Some embodiments of the HMD 405 have different components than those described in conjunction with FIG. 4. Additionally, the functionality provided by various components described in conjunction with FIG. 4 may be differently distributed among the components of the HMD 405 in other embodiments.

The DCA 420 captures data describing depth information of a local area surrounding some or all of the HMD 405. The DCA 420 can compute the depth information using the data (e.g., based on a captured portion of a structured light pattern), or the DCA 420 can send this information to another device such as the console 410 that can determine the depth information using the data from the DCA 420.

The display assembly 425 includes an electronic display and a variable LC array positioned in front of the electronic display. The display assembly 425 may be an embodiment of the display assembly 145 in FIG. 1B and/or the display assembly 205 in FIG. 2A. The electronic display of the display assembly 425 renders a specific image for a particular portion of the variable LC array. The electronic display of the display assembly 425 displays two-dimensional or three-dimensional images to the user in accordance with data received from the console 410. In various embodiments, the electronic display of the display assembly 425 comprises a single electronic display or multiple electronic displays (e.g., a display for each eye of a user). Examples of the electronic display of the display assembly 425 include: a LCD, an OLED display, an ILED display, an AMOLED display, a TOLED display, some other display, or some combination thereof. The electronic display of the display assembly 425 may be an embodiment of the electronic display 210 of FIG. 2A.

The variable LC array of the display assembly 425 includes a plurality of LC cells positioned in front of the electronic display. The variable LC array is configured to refract image light received from the electronic display based on a density of a dynamic lens array formed by LC cells that vary over different portions of the LC array. The variable LC array includes a gaze region comprising a subset of the LC cells having a lens array density different than one or more other lens array densities associated with remaining portions of the LC cells outside the gaze region. Location of the gaze region in the variable LC array changes based on user's gaze location tracked by the eye tracker 445. In some embodiments, the lens array density associated with the subset of the LC cells in the gaze region in the variable LC array is higher than the one or more other lens array densities associated with the remaining portions of the LC cells outside the gaze region. The variable LC array is configured to provide optical correction to image light emitted from the electronic display of the display assembly 425 such that a portion of image light refracted by the subset of the LC cells in the gaze region of the variable LC array is in focus at a user's eye. Other portions of image light refracted by the remaining portions of the LC cells outside the gaze region of the variable LC array is not in focus at the user's eye. The variable LC array of the display assembly 425 may be an embodiment of the LC array 215 in FIG. 2A.

The optical assembly 430 magnifies image light received from the display assembly 425, corrects optical errors associated with the image light, and presents the corrected image light to a user of the HMD 405. The optical assembly 430 includes a plurality of optical elements. Example optical elements included in the optical assembly 430 include: an aperture, a Fresnel lens, a convex lens, a concave lens, a filter, a reflecting surface, or any other suitable optical element that affects image light. Moreover, the optical assembly 430 may include combinations of different optical elements. In some embodiments, one or more of the optical elements in the optical assembly 430 may have one or more coatings, such as partially reflective or anti-reflective coatings.

Magnification and focusing of the image light by the optical assembly 430 allows the electronic display of the display assembly 425 to be physically smaller, weigh less and consume less power than larger displays. Additionally, magnification may increase the field-of-view of the content presented by the display assembly 425. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 430 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display assembly 425 for display is pre-distorted, and the optical assembly 430 corrects the distortion when it receives image light from the display assembly 425 generated based on the content. The optical assembly 430 may be configured to direct the portion of image light refracted by the subset of the LC cells in the gaze region of the variable LC array of the display assembly 425 toward the foveal region of the user's eye. The optical assembly 430 may be also configured to direct other portions of image light refracted by the remaining portions of the LC cells outside the gaze region of the variable LC array of the display assembly 425 toward at least one region of the user's eye outside the foveal region. The optical assembly 430 may be an embodiment of the optical assembly 150 in FIG. 1B and/or the optical assembly 220 in FIG. 2A.

The IMU 440 is an electronic device that generates data indicating a position of the HMD 405 based on measurement signals received from one or more of the position sensors 435 and from depth information received from the DCA 420. A position sensor 435 generates one or more measurement signals in response to motion of the HMD 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, roll). In some embodiments, the position sensors 435 may represent the position sensors 135 of FIG. 1A. In some embodiments, the IMU 440 rapidly samples the measurement signals and calculates the estimated current position of the HMD 405 from the sampled data. For example, the IMU 440 integrates the measurement signals received from the accelerometers over time to estimate a velocity vector and integrates the velocity vector over time to determine an estimated current position of a reference point on the HMD 405. Alternatively, the IMU 440 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 440 receives one or more parameters from the console 410. The one or more parameters are used to maintain tracking of the HMD 405. Based on a received parameter, the IMU 440 may adjust one or more IMU parameters (e.g., sample rate). In some embodiments, certain parameters cause the IMU 440 to update an initial position of the reference point so it corresponds to a next position of the reference point. Updating the initial position of the reference point as the next calibrated position of the reference point helps reduce accumulated error associated with the current position estimated the IMU 440. The accumulated error, also referred to as drift error, causes the estimated position of the reference point to "drift" away from the actual position of the reference point over time. In some embodiments of the HMD 405, the IMU 440 may be a dedicated hardware component. In other embodiments, the IMU 440 may be a software component implemented in one or more processors. The IMU 440 may be an embodiment of the IMU 130 in FIG. 1A.

The eye tracker 445 determines eye tracking information associated with an eye of a user wearing the HMD 405. The eye tracking information determined by the eye tracking system 445 may comprise information about an orientation of the user's eye, i.e., information about a gaze location that corresponds to a foveal region of the user's eye. In some embodiments, the eye tracker 445 is integrated into the optical assembly 430. An embodiment of the eye tracker 445 may comprise an illumination source and an imaging device (camera). The eye tracker 445 is configured to track the gaze location corresponding to the foveal region of a user's eye. The eye tracker 445 may provide information about the tracked gaze location to the varifocal module 450. The eye tracker 445 may be an embodiment of the eye tracker 225 in FIG. 2A.

The varifocal module 450 may be coupled to the eye tracker 445 to obtain eye tracking information determined by the eye tracker 445, i.e., information about the tracked gaze location. The varifocal module 450 may be configured to adjust focus of image light emitted from the electronic display of the display assembly 425. This is achieved by the varifocal module 450 instructing the variable LC array of the display assembly 425 to change location of the gaze region in the LC array having a specific lens array density to track gaze location of the user, based on the determined eye tracking information obtained from the eye tracker 445. In this way, the varifocal module 450 performs dynamic foveated rendering, based in part on the determined eye tracking information obtained from the eye tracker 445. In some embodiments, the varifocal module 450 mitigates vergence-accommodation conflict in relation to image light emitted from the electronic display of the display assembly 425 and refracted by the variable LC array of the display assembly 425. The varifocal module 450 may be mechanically interfaced (e.g., via positioners) with at least one of the electronic display of the display assembly 425, the variable LC array of the display assembly 425 and the optical assembly 430. The varifocal module 450 may be further configured to adjust focus of image light emitted from the display assembly 425 by adjusting position of at least one of the electronic display of the display assembly 425, the variable LC array of the display assembly 425 and the optical assembly 430, based on the determined eye tracking information obtained from the eye tracker 445. By adjusting the position, the varifocal module 450 varies focus of image light output from the display assembly 425 towards the user's eye. In one embodiment, the varifocal module 450 may utilize the depth information obtained by the DCA 420 to, e.g., generate content for presentation on the electronic display of the display assembly 425. The varifocal module 450 may be an embodiment of the varifocal module 164 in FIG. 1B and/or the controller 230 in FIG. 2A.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures IMU data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the DCA 420, the HMD 405, and the I/O interface 415. In the example shown in FIG. 4, the console 410 includes an application store 455, a tracking module 460, and an engine 465. Some embodiments of the console 410 have different modules or components than those described in conjunction with FIG. 4. Similarly, the functions further described below may be distributed among components of the console 410 in a different manner than described in conjunction with FIG. 4.

The application store 455 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 460 calibrates the HMD system 400 using one or more calibration parameters and may adjust one or more calibration parameters to reduce error in determination of the position of the HMD 405 or of the I/O interface 415. For example, the tracking module 460 communicates a calibration parameter to the DCA 420 to adjust the focus of the DCA 420 to more accurately determine positions of structured light elements captured by the DCA 420. Calibration performed by the tracking module 460 also accounts for information received from the IMU 440 in the HMD 405 and/or an IMU 440 included in the I/O interface 415. Additionally, if tracking of the HMD 405 is lost (e.g., the DCA 420 loses line of sight of at least a threshold number of structured light elements), the tracking module 460 may re-calibrate some or all of the HMD system 400.

The tracking module 460 tracks movements of the HMD 405 or of the I/O interface 415 using information from the DCA 420, the one or more position sensors 435, the IMU 440 or some combination thereof. For example, the tracking module 450 determines a position of a reference point of the HMD 405 in a mapping of a local area based on information from the HMD 405. The tracking module 460 may also determine positions of the reference point of the HMD 405 or a reference point of the I/O interface 415 using data indicating a position of the HMD 405 from the IMU 440 or using data indicating a position of the I/O interface 415 from an IMU 440 included in the I/O interface 415, respectively. Additionally, in some embodiments, the tracking module 460 may use portions of data indicating a position or the HMD 405 from the IMU 440 as well as representations of the local area from the DCA 420 to predict a future location of the HMD 405. The tracking module 460 provides the estimated or predicted future position of the HMD 405 or the I/O interface 415 to the engine 455.

The engine 465 generates a 3D mapping of the area surrounding some or all of the HMD 405 (i.e., the "local area") based on information received from the HMD 405. In some embodiments, the engine 465 determines depth information for the 3D mapping of the local area based on information received from the DCA 420 that is relevant for techniques used in computing depth. The engine 465 may calculate depth information using one or more techniques in computing depth from structured light. In various embodiments, the engine 465 uses the depth information to, e.g., update a model of the local area, and generate content based in part on the updated model.

The engine 465 also executes applications within the HMD system 400 and receives position information, acceleration information, velocity information, predicted future positions, or some combination thereof, of the HMD 405 from the tracking module 460. Based on the received information, the engine 465 determines content to provide to the HMD 405 for presentation to the user. For example, if the received information indicates that the user has looked to the left, the engine 465 generates content for the HMD 405 that mirrors the user's movement in a virtual environment or in an environment augmenting the local area with additional content. Additionally, the engine 465 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

In some embodiments, based on the eye tracking information (e.g., orientation of the user's eye) received from the eye tracker 445, the engine 465 determines resolution of the content provided to the HMD 405 for presentation to the user. The engine 465 provides the content to the HMD 405 having a maximum pixel resolution on the electronic display of the display assembly 425 in a foveal region of the user's gaze, whereas the engine 465 provides a lower pixel resolution in other regions of the electronic display of the display assembly 425, thus achieving less power consumption at the HMD 405 and saving computing cycles of the console 410 without compromising a visual experience of the user. In some embodiments, the engine 465 can further use the eye tracking information to adjust where objects are displayed on the electronic display of the display assembly 425 to mitigate vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
    a display assembly comprising an electronic display and a liquid crystal (LC) array,
        wherein
        the electronic display is configured to emit image light, and
        the LC array includes a plurality of LC cells positioned in front of the electronic display and is configured to refract the image light received from the electronic display, a dynamic lens array formed by the LC cells, a gaze region of the LC array comprising a subset of the LC cells forming a portion of the dynamic lens array having a lens density different than one or more other lens densities of one or more other portions of the dynamic lens array associated with remaining portions of the LC cells outside the gaze region, the lens density controlled by controlling sizes of diameters of lenses formed by the subset of the LC cells;
    an eye tracker configured to track a gaze location corresponding to a foveal region of a user's eye, wherein a location of the gaze region in the LC array changes based on the tracked gaze location; and
    an optical assembly configured to direct the image light refracted by the LC array to an eye box of the HMD corresponding to a location of the user's eye.

2. The HMD of claim 1, wherein the HMD further comprises a controller coupled to the eye tracker and the LC array, the controller configured to:
receive information about the tracked gaze location from the eye tracker;
generate emission instructions based on the information about the tracked gaze location; and
provide the emission instructions to the LC array to change the location of the gaze region in the LC array in accordance with the tracked gaze location.

3. The HMD of claim 1, wherein the HMD further comprises a controller coupled to the eye tracker and the LC array, the controller configured to:
control phase functions of one or more subsets of the LC cells to generate the gaze region of the LC array tracking the gaze location, based on information about the tracked gaze location from the eye tracker.

4. The HMD of claim 1, wherein the lens density of the portion of the dynamic lens array associated with the gaze region of the LC array is higher than the one or more other lens densities of the one or more other portions of the dynamic lens array.

5. The HMD of claim 1, wherein the HMD further comprises a controller coupled to the eye tracker and the LC array, the controller configured to:
determine mapping between a plurality of regions of the LC array and different gaze locations of the user's eye; and
store information about the mapping in a memory coupled to the controller.

6. The HMD of claim 5, wherein the controller is further configured to:
provide emission instructions to the LC array to change the location of the gaze region in the LC array to one of the plurality of regions, based on the tracked gaze location and the information about the mapping.

7. The HMD of claim 1, wherein the LC array is configured to provide optical correction to the image light such that a portion of the image light refracted by the subset of the LC cells in the gaze region of the LC array is in focus at the user's eye.

8. The HMD of claim 7, wherein the optical assembly is configured to direct the portion of the image light toward the foveal region of the user's eye.

9. The HMD of claim 1, wherein a portion of the image light refracted by the remaining portions of the LC cells outside the gaze region of the LC array is not in focus at the user's eye.

10. The HMD of claim 9, wherein the optical assembly is configured to direct the portion of the image light toward a region of the user's eye outside the foveal region.

11. A head-mounted display (HMD) comprising:
an electronic display configured to emit image light;
a liquid crystal (LC) array including a plurality of LC cells positioned in front of the electronic display and configured to refract the image light received from the electronic display, a dynamic lens array formed by the LC cells, a gaze region of the LC array comprising a subset of the LC cells forming a portion of the dynamic lens array having a lens density different than one or more other lens densities of one or more other portions of the dynamic lens array associated with remaining portions of the LC cells outside the gaze region, the lens density controlled by controlling sizes of diameters of lenses formed by the subset of the LC cells;
an eye tracker configured to track a gaze location corresponding to a foveal region of a user's eye;
a controller coupled to the eye tracker and the LC array, the controller configured to:
generate emission instructions based on information about the tracked gaze location, and
provide the emission instructions to the LC array to change a location of the gaze region in the LC array in accordance with the tracked gaze location; and
an optical assembly configured to direct the image light refracted by the LC array to an eye box of the HMD corresponding to a location of the user's eye.

12. The HMD of claim 11, wherein the lens density of the portion of the dynamic lens array associated with the gaze region of the LC array is higher than the one or more other lens densities of the one or more other portions of the dynamic lens array.

13. The HMD of claim 11, wherein:
the LC array is configured to provide optical correction to the image light such that a portion of the image light refracted by the subset of the LC cells in the gaze region of the LC array is in focus at the user's eye, and
the optical assembly is configured to direct the portion of the image light toward the foveal region of the user's eye.

14. The HMD of claim 11, wherein the controller is further configured to:
control phase functions of one or more subsets of the LC cells to generate the gaze region of the LC array tracking the gaze location, based on information about the tracked gaze location from the eye tracker.

15. The HMD of claim 11, wherein the controller is further configured to:
determine mapping between a plurality of regions of the LC array and different gaze locations of the user's eye; and
store information about the mapping in a memory coupled to the controller.

16. The HMD of claim 15, wherein the controller is further configured to:
provide the emission instructions to the LC array to change the location of the gaze region in the LC array to one of the plurality of regions, based on the tracked gaze location and the information about the mapping.

17. A method of controlling a head-mounted display (HMD), the method comprising:
tracking a gaze location corresponding to a foveal region of a user's eye;
generating emission instructions based in part on the tracked gaze location;
providing the emission instructions to a liquid crystal (LC) array including a plurality of LC cells configured to refract image light emitted from an electronic display of the HMD toward an eye box corresponding to a location of the user's eye, a dynamic lens array formed by the LC cells, a gaze region of the LC array comprising a subset of the LC cells forming a portion of the dynamic lens array having a lens density based in part on the emission instructions different than one or more other lens densities of one or more other portions of the dynamic lens array associated with remaining portions of the LC cells outside the gaze region, the lens density controlled by controlling sizes of diameters of lenses formed by the subset of the LC cells;
providing the emission instructions to the LC array to change a location of the gaze region in the LC array in accordance with the tracked gaze location; and directing the image light refracted by the LC array to an eye box of the HMD corresponding to a location of the user's eye.

18. The method of claim 17, wherein a portion of the image light refracted by the subset of the LC cells in the gaze region of the LC array is in focus at the user's eye.

19. The method of claim 17, further comprising:
determining mapping between a plurality of regions of the LC array and different gaze locations of the user's eye; and providing the emission instructions to the LC array to change the location of the gaze region in the LC array to one of the plurality of regions, based on the tracked gaze location and information about the mapping.

* * * * *